Dec. 10, 1929.   R. F. HALL   1,739,140
MACHINE FOR THE MANUFACTURE OF GLASS ARTICLES
Filed Sept. 17, 1927
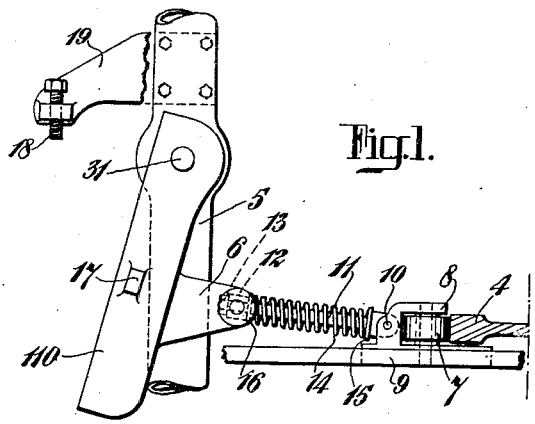
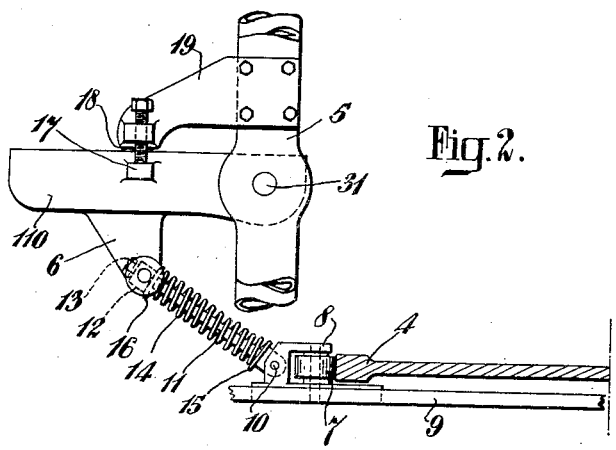
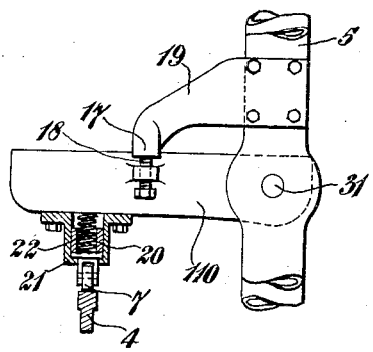
INVENTOR
ROBERT FREDERICK HALL,
BY
HIS ATTORNEY Patented Dec. 10, 1929

1,739,140

UNITED STATES PATENT OFFICE

ROBERT FREDERICK HALL, OF WYTHALL, NEAR BIRMINGHAM, ENGLAND

MACHINE FOR THE MANUFACTURE OF GLASS ARTICLES

Application filed September 17, 1927, Serial No. 220,217, and in Great Britain November 18, 1926.

This invention relates to the manufacture of glass articles, and refers to a machine of the type comprising a framework carrying a set or sets of devices for forming glass articles, such for example as bottles.

In machines of the foregoing description, it is customary to provide cams, and to operate the devices for forming the glass articles—such for instance as the dipping head, in the case of a suction machine for manufacturing bottles, the opening and closing of the parison mould, the opening and closing of the finishing moulds, and other operations—from cam rollers co-operating with the said cams.

In the case of the finishing moulds, in one class of bottle making machines, comprising a fixed central column carrying the cams and a rotary framework carrying the bottle making devices, the finishing moulds have been raised by means of an outer cam, at the outside of the rotary framework, the table or the like carrying the finishing mould being provided with a roller or caster on the underside running upon the surface of the cam and causing the table or the like to be raised and lowered at appropriate times during the rotation of the framework.

In another class of automatic bottle making machines, such for example as the machines for which the present applicant obtained a patent in Great Britain No. 165,453 the mould is counterbalanced, and is raised from the interior of the framework by means of a cam roller and appropriate mechanism co-operating with a cam on a fixed support within the rotary framework.

In the case of the manufacture of a bottle for instance, it is necessary to bring up the top of the finishing mould very close to, but not actually into contact with, the neck or ring mould, and the top of the finishing mould must be held rigidly and without vibration in this relative position, to prevent damage to the neck of the bottle being blown.

The object of the present invention is to provide simple, compact and efficient mechanism for raising a mould, such mechanism being actuated by means of a cam, which, in the case of a rotary framework carrying the mechanisms may be mounted on a central column or other appropriate portion of the machine.

The mechanism is particularly suitable for raising the finishing mould in the case of a rotary automatic machine for the manufacture of glass articles, although not limited in any way to such application.

According to the general principle of the invention, a suitable cam is provided in connection with one of the co-operating portions of the machine, for instance on the fixed base or central column, where a rotary framework is provided upon which is mounted the table or the like for carrying the mould. This table has towards the outer extremity a bracket or brackets or their equivalents, on the underside, to which is pivotally connected one end of a link, the other end of which is connected to a slide mounted in a suitable guide in the rotary framework and furnished with means for carrying the cam roller co-operating with the before mentioned cam.

In the preferred arrangement, the link is so constructed that it is adapted to telescope or to be shortened to a certain extent, with respect to is pivotal bearings, under spring control, in order to secure a certain buffering action and for the further purpose hereinafter explained.

In order to hold the top of the finishing mould rigidly and without vibration in correct relation to the neck mould in the raised position and to prevent damage to the neck of the bottle being blown, co-operating stops are provided on the swinging table carrying the finishing mould and on a relatively fixed portion of the rotary framework, in such a way that when the finishing mould is brought up so that the stops come into contact with one another, it is held steadily and without vibration with the top at the correct distance from the neck mould, under the pressure of the spring means in connection with the before mentioned link.

In a convenient practical construction, the finishing mould table is provided at the side with a projecting lug through which screws a bolt, the upper end of which is adapted to co-operate with a corresponding arm or projection on the side of the relatively fixed framework. In this way, by turning the bolt, a very accurate adjustment may be obtained.

It is of course evident that the bolt might screw through a lug or the like on the framework and co-operate with a projection on the table.

Stops of the foregoing description may also be adapted to machines in which the moulds are raised by means of outside cams.

In order that the invention may be better understood it will now be described with reference to the accompanying drawing, in which:—

Figs. 1 and 2 show fragmentary diagrammatic views of a finishing mould table and its associated cam and operating mechanism, in the lowered and raised positions respectively.

Fig. 3 shows a similar view to Fig. 2, illustrating the application of the stops to a construction in which the finishing mould table is raised by means of an external cam.

Referring to Figs. 1 and 2, 4 is a cam of suitable shape, attached in any desired manner to the central column or other fixed part of the machine. 5 is a bifurcated column forming a part of a unit carrying the various moulds and associated parts and mounted upon or forming part of a rotary framework, rotating about the central column. Between the two portions of a bifurcated column 5 is mounted the table or the like 110, for carrying the finishing mould (not shown) upon trunnions 31, the construction being similar to that described in the specification of my before mentioned British Patent No. 165,453.

On the under side of the table 110 are mounted, towards the outer extremity, brackets 6. 7 is a cam roller mounted in a slide 8 adapted to work in a slideway 9. To this slide 8 is pivotally connected at 10 one end of a rod 11, the other end of which passes through a plain bore in a block or trunnion 12 pivotally mounted between the fork-like brackets 6. On the end of the rod 11, beyond the block 12, is fixedly attached a nut 13. 14 is a compression spring around the rod 11, mounted between abutments 15 and 16.

As will be seen from Figs. 1 and 2, owing to the shape of the cam, as the rotary framework moves around the fixed central column, the cam roller 7 forces the slide 8 outwards, and this through the rod 11 and spring 14 moves the table 110 to the upper position, the spring ensuring a certain buffering action.

In order to stop the rise of the table so that the top of the finishing mould is very close to but not actually in contact with the neck or ring mould, co-operating stops are provided on the swinging table and on a relatively fixed portion of the rotary framework.

For example, such a stop 17 is shown, on Figs. 1 and 2 on the table 110 adapted to co-operate with the adjustable stop 18 formed by a screw, carried by a bracket 19 attached to one portion of the bifurcated column 5. When the finishing mould is brought up by the table 110, so that the stops 17 and 18 come into contact, the finishing mould is held steady and without vibration with the top at the required distance from the neck mould, under the pressure of the spring 14 surrounding the rod 11. For this purpose, in the upper position, the parts may be of such dimensions and so adjusted that the undersurface of the nut 13 is just forced away from the surface of the trunnion 12 with which it normally makes contact.

Although in Figs. 1 and 2, the adjustable stop is shown on the bracket 19, in some cases the bracket may carry the fixed stop and the adjustable stop may be carried by the table.

In Fig. 3 the cam operates a roller 7 carried by a sliding sleeve 20, enclosed within a somewhat cylindrical bracket 21 fastened to the underside of the table 110, and a compression spring 22 comes between the under-side of the table and the interior of the sleeve 20. The compression spring 22 forms the buffering connection between the cam roller and the table. In Fig. 3, the table 110 is shown as provided with the adjustable stop 18 and the bracket 19 with the fixed stop 17.

In general the particular details of construction and methods of application of the invention may be varied considerably without departing from the principles of the invention.

Having now particularly described and ascertained the nature of my said invention and in what manner the same is to be performed, I declare that what I claim is:—

1. In a machine for the manufacture of glass articles, comprising a fixed element, a frame movable with respect to such element, and a table carrying a mould, said table being pivotally mounted upon the frame; means for raising and lowering the table, including a cam in connection with a fixed element, a bracket carried on the underside of and towards the end of the pivoted table, a link pivotally connected at one end to the said bracket and at the other end to a slide mounted in a suitable guide in the frame, the said slide being furnished with means for carrying a cam roller cooperating with the before mentioned cam for the purposes set forth.

2. In a machine for the manufacture of glass articles comprising a fixed element, a frame movable with respect to such element, and a table carrying a mould, said table being pivotally mounted upon the frame; means for raising and lowering the table including a cam in connection with the fixed element, a bracket carried on the underside of and towards the end of the pivoted table, a slide mounted in a suitable guide in the frame, the said slide being furnished with means for carrying a cam roller cooperating with the before mentioned cam, a link pivotally connected at one end to the before mentioned bracket and at the other end to the before mentioned slide and spring controlled means for allowing the link to telescope and become shortened with respect to its pivotal bearings for the purposes set forth.

3. In a machine for the manufacture of glass articles comprising a fixed element, a frame movable with respect to such element, and a table carrying a mould, said table being pivotally mounted upon the frame; means for raising and lowering the table including a cam in connection with the fixed element, a bracket carried on the underside of and towards the end of the pivoted table remote from the movable frame, a slide mounted in a suitable guide in the frame, the said slide being furnished with means for carrying a cam roller cooperating with the before mentioned cam, a link pivotally mounted at one end to the before mentioned bracket and at the other end to the before mentioned slide, spring buffering means allowing for the shortening of the distance between the pivotal connections of the link with respect to the slide and the bracket, a stop on the swinging table and a corresponding cooperating stop on the fixed portion of the frame, in order to limit the motion of the swinging table and allow it to be firmly held in a definite position under spring control, substantially as described.

4. In a machine for the manufacture of glass articles comprising a fixed element, a frame movable with respect to such element, and a table carrying a mould, said table being pivotally mounted upon the frame; means for raising and lowering the table including a cam in connection with the fixed element, a bracket carried on the underside of and towards the end of the pivoted table remote from the movable frame, a slide mounted in a suitable guide in the frame, the said slide being furnished with means for carrying a cam roller cooperating with the before mentioned cam, a link pivotally mounted at one end to the before mentioned bracket and at the other end to the before mentioned slide, spring buffering means allowing for the shortening of the distance between the pivotal connections of the link with respect to the slide and the bracket, a stop on the swinging table and a corresponding cooperating stop on the fixed portion of the frame, one at least of the said stops being made adjustable, in order to adjust the position at which the table is brought to rest under spring control in its raised position, substantially as described.

5. In a machine for the manufacture of glass articles, the combination with a fixed member, of a frame movable relative to said member, a mould-supporting table pivoted on the frame, a stop on the frame to limit the upward movement of the table, and means for swinging said table including a cam secured to the fixed member, a cam follower carried by the frame, and a compressible link connecting the table and follower.

6. In a machine for the manufacture of glass articles, the combination with a fixed member, of a frame movable relative to said member, a mould-supporting table pivoted on the frame, lugs respectively carried by the frame and table, a stop adjustably connected to one lug for engagement by the other lug to limit the upward movement of the table, and means for swinging said table including a cam secured to the fixed member, a cam follower carried by the frame, and a compressible link connecting the table and follower.

7. In a machine for the manufacture of glass articles, the combination with a fixed member, of a frame movable relative to said member, a mould-supporting table pivoted on the frame, a stop on the frame to limit the upward movement of the table, and means for swinging said table including a cam secured to the fixed member, a cam follower carried by the frame, a guide for directing the follower in a straight line extending at right angles to the pivot of the table, and a compressible link connecting the table and follower.

In witness whereof I affix my signature.

ROBERT FREDERICK HALL.